United States Patent [19]

DeZorzi

[11] Patent Number: 5,677,079
[45] Date of Patent: Oct. 14, 1997

[54] BATTERY TERMINAL SYSTEM

[75] Inventor: Timothy DeZorzi, South Lyon Livingston, Mich.

[73] Assignee: Trw Inc., Lyndhurst, Ohio

[21] Appl. No.: 716,879

[22] Filed: Sep. 20, 1996

[51] Int. Cl.⁶ ............................................. H01M 2/10
[52] U.S. Cl. ........................ 429/99; 429/100; 429/178
[58] Field of Search ............................... 429/100, 99, 96, 429/178

[56] References Cited

U.S. PATENT DOCUMENTS

| | | |
|---|---|---|
| 3,655,452 | 4/1972 | Cich . |
| 3,660,169 | 5/1972 | Clune et al. . |
| 3,891,462 | 6/1975 | Langkau . |
| 3,969,142 | 7/1976 | Greatbatch et al. . |
| 4,842,966 | 6/1989 | Omori et al. . |
| 5,039,580 | 8/1991 | Mori et al. . |
| 5,188,912 | 2/1993 | Katoh et al. . |
| 5,433,035 | 7/1995 | Bauer . |

Primary Examiner—John S. Maples
Attorney, Agent, or Firm—Tarolli, Sundheim, Covell, Tummino & Szabo

[57] ABSTRACT

A pair of electrical terminals (72, 94) engage one or more cylindrical batteries (20, 22), each of which has a pair of circular opposite end surfaces (28, 30) defined by a pair of electrodes (26, 24), with one (28) of the end surfaces (28, 30) having a first radius (R1) and the other (30) having a second, greater radius (R2). The terminals (72, 94) define a pair of electrical contact surfaces (78, 96). The contact surfaces (78, 96) are spaced from each other along an axis (51) and face axially toward each other. A retaining structure (40) retains at least one battery (20) in an installed position centered on the axis (51) with the end surfaces (28, 30) engaged axially between the contact surfaces (78, 94). One (94) of the contact surfaces (78, 94) is spaced radially from the axis (51) a distance (D1) greater than the first radius (R1).

10 Claims, 3 Drawing Sheets

5,677,079

BATTERY TERMINAL SYSTEM

FIELD OF THE INVENTION

The present invention relates to the use of batteries known as "button" or "coin" batteries, and particularly relates to a terminal system for use with such batteries.

BACKGROUND OF THE INVENTION

A button or coin type battery has a short, generally cylindrical shape with circular opposite end surfaces. One of the end surfaces is defined by a positive electrode shell. The other end surface is defined by a negative electrode shell. When the battery is correctly installed in an electrical device, the positive electrode shell contacts a positive electrical terminal in the device. The negative electrode shell likewise contacts a negative electrical terminal.

If the battery is incorrectly installed in a reversed orientation, it could energize the device with reverse polarity. In the prior art, this is avoided by arranging the positive electrical terminal at the side of the battery so as to engage a side surface, rather than the end surface, of the positive electrode shell. The positive terminal will then contact only the positive electrode shell when the battery is in either the correct or the reversed orientation. It is also known in the prior art to include additional circuitry that is constructed specifically to provide the electrical device with reverse voltage protection when a battery is installed in a reversed orientation.

SUMMARY OF THE INVENTION

The present invention is an apparatus for use with one or more cylindrical batteries having circular opposite end surfaces. The opposite end surfaces of each battery are defined by a pair of electrodes. One of the end surfaces has a first radius. The other has a second, greater radius.

In accordance with the present invention, the apparatus comprises a pair of electrical terminals defining a pair of electrical contact surfaces. The contact surfaces on the terminals are spaced from each other along an axis, and face axially toward each other. The apparatus further comprises means for retaining the batteries in installed positions. When the batteries are in their installed positions, they are centered on the axis, and their end surfaces are engaged axially between the contact surfaces on the terminals. One of the contact surfaces is spaced radially outward from the axis a distance greater than the first radius.

An apparatus constructed in accordance with the present invention provides reverse voltage protection for a button battery without the use of a terminal at the side of the battery, and without the use of additional circuitry. This is because the contact surface that engages the larger end surface on the battery is located radially outward of the smaller end surface on the battery. Therefore, that contact surface cannot make a reverse polarity connection with the smaller end surface if the battery is mistakenly installed in a reversed orientation.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
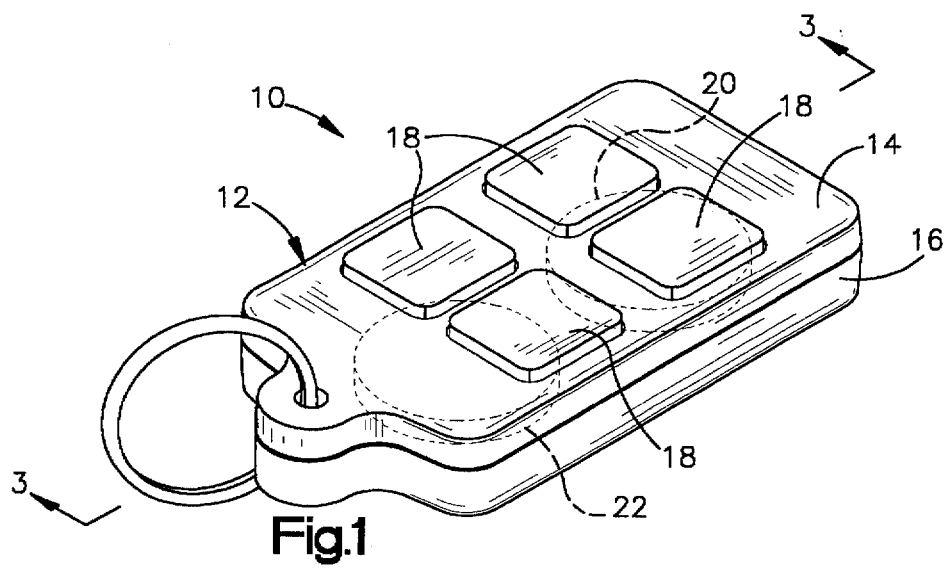
FIG. 1 is a perspective view of an apparatus comprising a preferred embodiment of the present invention.

An apparatus 10 comprising a first embodiment of the present invention is shown in FIG. 1. The apparatus 10 is a remote control transmitter for a keyless vehicle entry system. As shown in FIG. 1, the transmitter 10 has a housing 12 with upper and lower parts 14 and 16 that are releasably interlocked together. The upper housing part 14 supports a plurality of pushbuttons 18 for various functions of the vehicle entry system. The lower housing part 16 contains a pair of button batteries 20 and 22 (shown in phantom in FIG. 1) which together comprise a power source for generation and transmission of radio-frequency signals that control the vehicle entry system upon depression of the pushbuttons 18.

Figure 2:
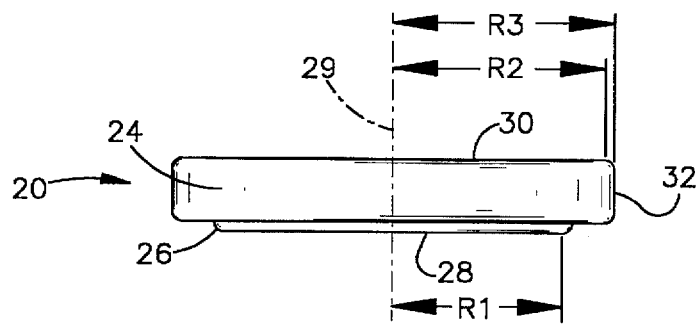
FIG. 2 is a side view of a battery included in the apparatus of FIG. 1.

The batteries 20 and 22 are alike. As shown in FIG. 2 with reference to the first battery 20, each of the two batteries 20 and 22 has a short cylindrical shape defined by positive and negative electrode shells 24 and 26. The negative electrode shell 26 has a planar, circular base surface 28 perpendicular to a central axis 29 of the battery 20. The base surface 28 has a first radius R1. The positive electrode shell 24 also has a planar, circular base surface 30 perpendicular to the axis 29, and further has a side or edge surface 32 extending circumferentially around the axis 29. The base surface 30 has a second radius R2 which is substantially greater than the first radius R1. The cylindrical side surface 32 preferably has a third radius R3 which is Just slightly greater than the second radius R2.

The lower housing part 16 has a pair of generally cylindrical inner walls 40 and 42 (FIGS. 3 and 4) projecting upward toward the upper housing part 14. The inner walls 40 and 42 define a corresponding pair of battery compartments 44 and 46. As shown fully in FIGS. 3 and 4, the first battery compartment 44 has a circular area 48 defined by a circular portion 50 of the inner wall 40. The circular portion 50 of the inner wall 40 is centered on an axis 51, and is circumferentially discontinuous across a plurality (preferably three) of gaps 52. Each gap 52 contains a flexible, upstanding retention finger 54 with a wedge-shaped upper end portion 56. The first battery compartment 44 further has a rectangular area 58 adjoining, and projecting radially from, the circular area 48. The rectangular area 58 is defined on three sides by a U-shaped portion 60 of the inner wall 40. The second battery compartment 46, which is shown partially in FIGS. 3 and 4, has the same size and shape as the first battery compartment 44 so that each compartment 44 and 46 can receive either of the two batteries 20 and 22.

A pair of negative electrical terminals 70 and 72, which also are alike, are located in the battery compartments 44 and 46, respectively. In the first embodiment of the present invention, each of the negative terminals 70 and 72 is a flexible metal strip with an inner section 74 and an outer section 76. The inner sections 74 extend somewhat diametrically across the circular areas 48 of the battery compartments 44 and 46, and each one has an electrical contact surface 78 facing axially upward. The outer sections 76 project upward from the rectangular areas 58 of the battery compartments 44 and 46. Each of the negative terminals 70 and 72 further has an intermediate section 82 which is fixed to the lower housing part 16 within the corresponding battery compartment 44 or 46. The intermediate sections 82 of the negative terminals 70 and 72 can be fixed to the lower housing part 16 in any suitable manner known in the art, such as by an adhesive bond (not shown).

The upper housing part 14 contains a circuit board 90 with a conductive metal layer 92. The circuitry defined by the metal layer 92, as well as other components (not shown) of the transmitter 10 that cooperate to generate and transmit radio-frequency signals, can have any suitable configuration and structure known in the art. However, in accordance with the present invention, certain portions 94 of the metal layer 92 are constructed as positive electrical terminals for the batteries 20 and 22.

Figure 5:
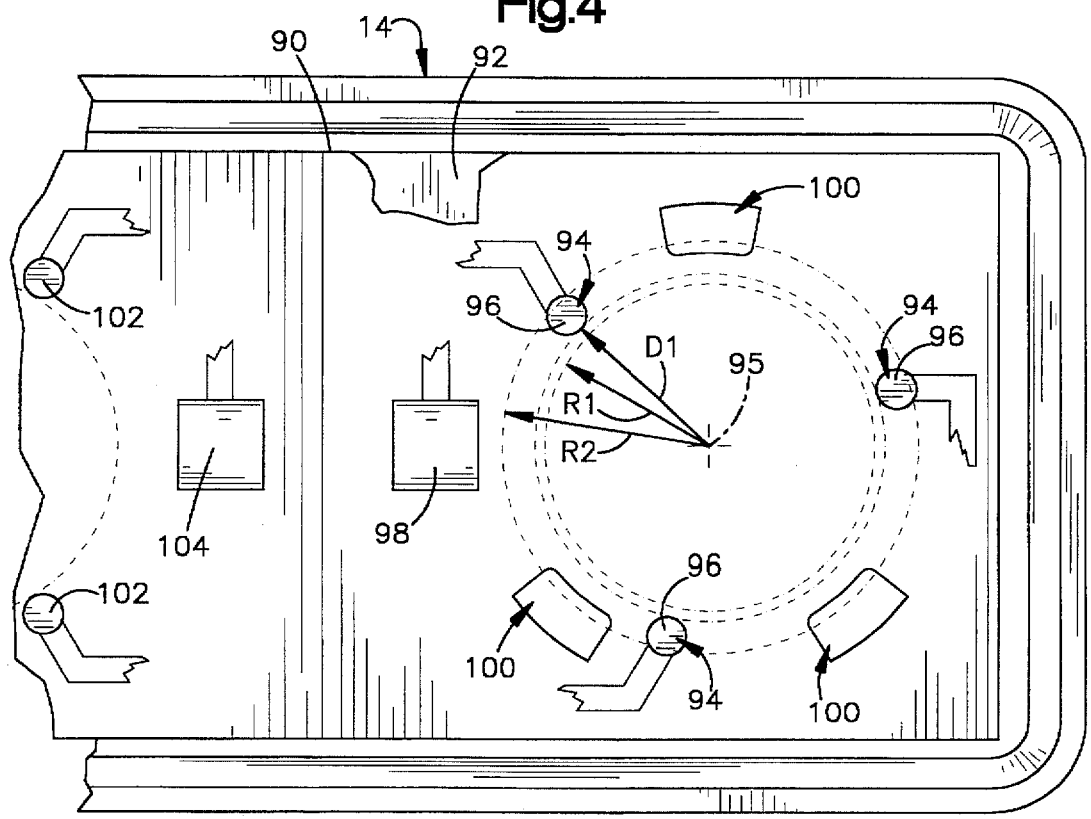
FIG. 5 is a view taken on line 5—5 of FIG. 3.

As shown in FIG. 5, three of the positive terminals 94 are arranged in a circular array centered on an axis 95. The positive terminals 94 have electrical contact surfaces 96. Each contact surface 96 has a planar contour perpendicular to the axis 95, and is spaced a distance D1 from the axis 95. The distance D1 is greater than the first radius R1 described above with reference to FIG. 2, and is less than the second radius R2. A negative conductor portion 98 of the metal layer 92 is located radially outward of the circular array of positive terminals 94.

Figure 6:
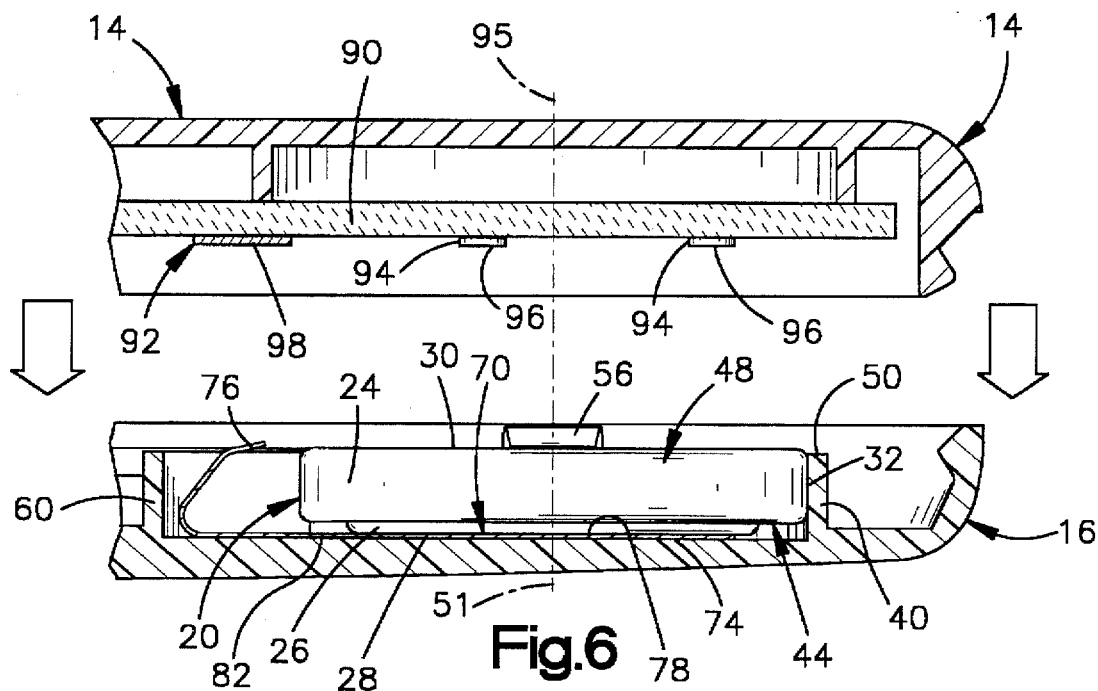
FIG. 6 is a view similar to FIG. 3 showing the battery of FIG. 2 in an installed position.

The first battery 20 is received in the first battery compartment 44 in the installed orientation shown in FIG. 6. Specifically, the first battery 20 is received coaxially within the circular area 48 of the first compartment 44. The cylindrical side surface 32 of the positive electrode shell 24 fits closely against the surrounding circular wall portion 50. The upper end portions 56 of the retention fingers 54 engage the base surface 30 of the positive electrode shell 24. In this arrangement, the first battery 20 is pressed axially against the first negative terminal 70 so as to flatten the inner section 74 of the first negative terminal 70. The base surface 28 of the negative electrode shell 26 is thus pressed against the contact surface 78.

When the upper housing part 14 is moved downward into interlocked engagement with the lower housing part 16, as indicated by the arrows shown in FIG. 6, the upper end portions 56 of the retention fingers 54 are received through clearance openings 100 (FIG. 5) in the circuit board 90. The negative conductor 98 on the circuit board 90 is moved downward into contact with the outer section 76 of the first negative terminal 70. The circular array of positive terminals 94 (FIG. 5) on the circuit board 90 is simultaneously moved coaxially downward into contact with the battery 20. As a result, the contact surfaces 96 on the positive terminals 94 contact the base surface 30 on the positive electrode shell 24 at locations that are spaced radially outward from the base surface 28 on the negative electrode shell 26. Therefore, if the battery 20 had been mistakenly installed in an inverted orientation, i.e., with the base surface 28 facing axially upward toward the positive terminals 94, the positive terminals 94 would not contact the base surface 28.

Figure 3:
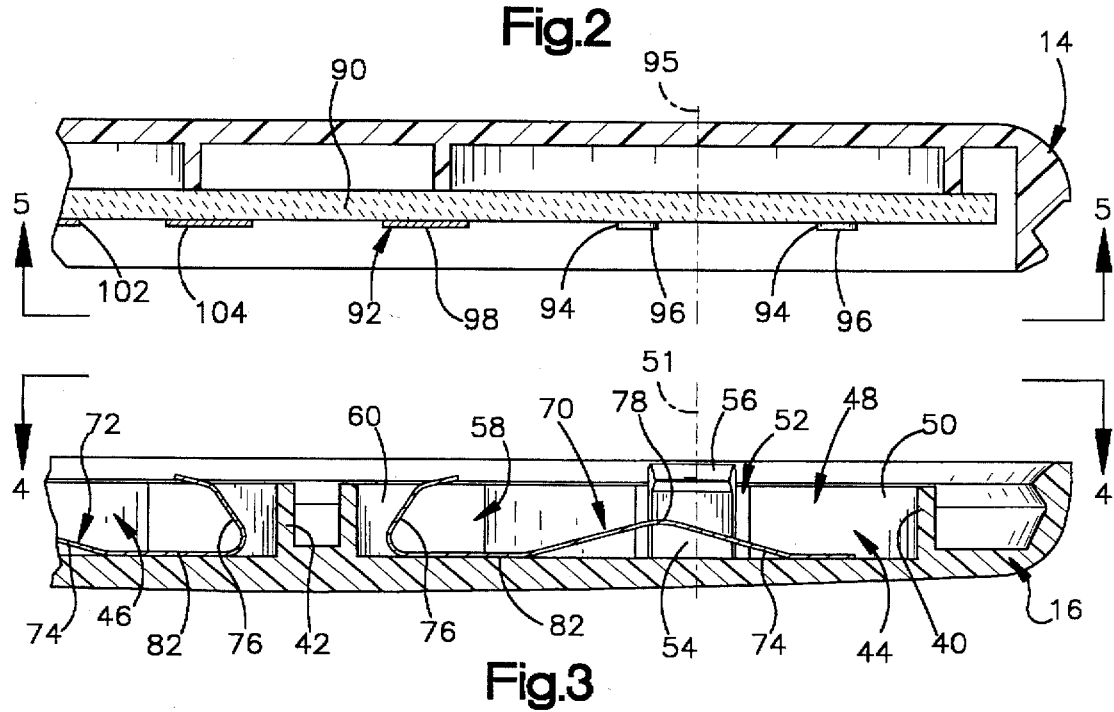
FIG. 3 is a sectional side view of parts of the apparatus of FIG. 1 taken along line 3—3 of FIG. 1.
Figure 4:
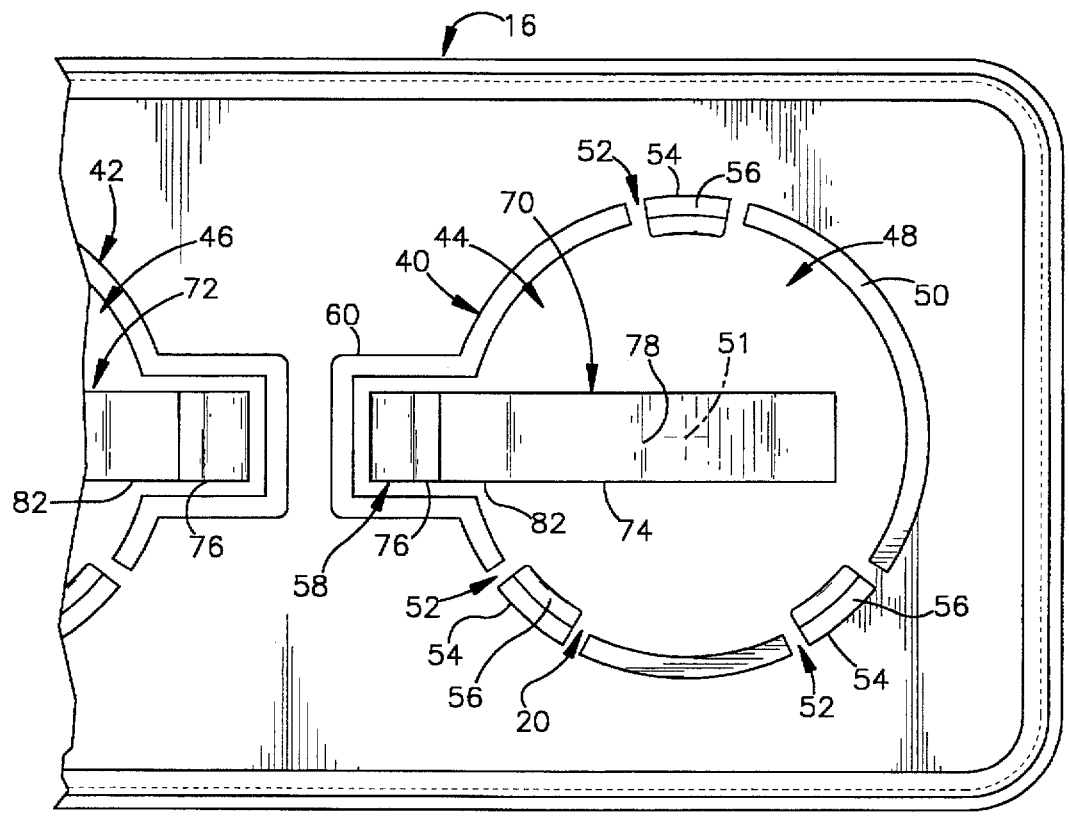
FIG. 4 is a view taken on line 4—4 of FIG. 3.

As shown partially in FIGS. 3, 5 and 6, the metal layer 92 on the circuit board 90 further defines a second circular array of positive electrical terminals 102, as well as a second negative conductor 104, for engaging the second battery 22 and the second negative terminal 72 in the same manner 22 described above with reference to the first battery 20 and the first negative terminal 70.

Figure 7:
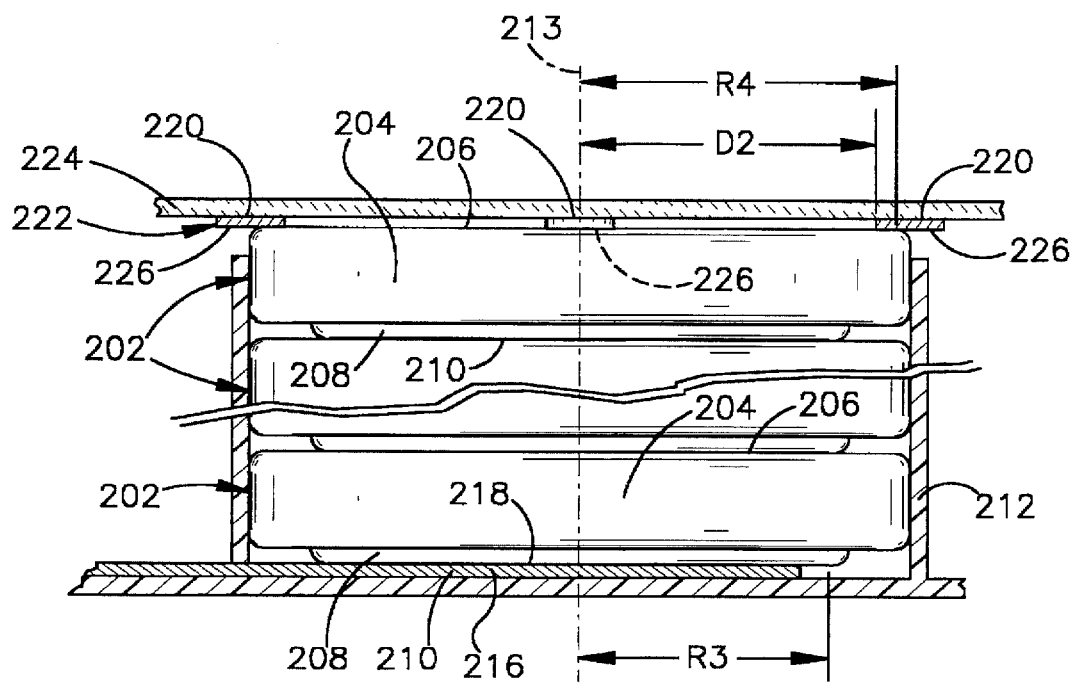
FIG. 7 is a partial view of an apparatus comprising a second embodiment of the present invention.

An apparatus 200 comprising a second embodiment of the present invention is shown partially in FIG. 7. The apparatus 200 includes a plurality of button batteries 202 which are substantially the same as the batteries 20 and 22 described above. Each battery 202 thus has a positive electrode shell 204 with a circular base surface 206, and further has a negative electrode shell 208 with a circular base surface 210. The base surfaces 210 on the negative electrode shells 208 have a radius R3. The base surfaces 206 on the positive electrode shells 204 have a greater radius R4.

A retention structure 212 holds the batteries 202 in a stack centered on an axis 213. A negative electrical terminal 216 at the bottom of the stack has an electrical contact surface 218 facing axially upward. A plurality of positive electrical terminals 220 are defined by a conductive metal layer 222 on a circuit board 224 at the top of the stack. The positive terminals 220 have electrical contact surfaces 224 facing axially downward. Each positive contact surface 226 has a planar contour perpendicular to the axis 213, and is spaced a distance D2 from the axis 213. The distance D2 is greater than the radius R3, and is less than the radius R4.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use with one or more cylindrical button batteries, each of which has planar circular opposite end surfaces defined by a pair of electrodes, with one of the end surfaces having a first radius and the other having a second, greater radius, said apparatus comprising:
    a pair of electrical terminals defining a pair of electrical contact surfaces, said contact surfaces being spaced from each other and facing toward each other in opposite directions parallel to an axis; and
    means for retaining said one or more button batteries centered on said axis with said end surfaces engaged axially between said contact surfaces;
    one of said contact surfaces being spaced radially from said axis a distance greater than said first radius.

2. Apparatus as defined in claim 1 wherein said one of said contact surfaces is a positive contact surface.

3. Apparatus as defined in claim 1 wherein said one of said contact surfaces has a planar contour and lies in a plane perpendicular to said axis.

4. Apparatus as defined in claim 3 wherein said one of said contact surfaces is defined by a portion of a conductive metal layer on a circuit board.

5. Apparatus as defined in claim 3 wherein said one of said contact surfaces is one of a plurality of contact surfaces in a circular array centered on said axis.

6. Apparatus comprising:
    at least one cylindrical button battery having a central axis and planar circular opposite end surfaces defined by a pair of electrodes centered on said axis, one of said end surfaces being smaller than the other; and
    a pair of electrical terminals defining a pair of electrical contact surfaces facing oppositely toward said end surfaces in directions parallel to said axis, one of said contact surfaces being located radially outward of said smaller end surface.

7. Apparatus as defined in claim 6 wherein said one of said contact surfaces is a positive contact surface.

8. Apparatus as defined in claim 6 wherein said one of said contact surfaces has a planar contour and lies in a plane perpendicular to said axis.

9. Apparatus as defined in claim 8 wherein said one of said contact surfaces is defined by a portion of a conductive metal layer on a circuit board.

10. Apparatus as defined in claim 8 wherein said one of said contact surfaces is one of a plurality of contact surfaces in a circular array centered on said axis.

* * * * *